US006255572B1

(12) United States Patent
Moghaddam et al.

(10) Patent No.: US 6,255,572 B1
(45) Date of Patent: Jul. 3, 2001

(54) RATTLING PERCUSSION INSTRUMENT

(75) Inventors: Akbar Moghaddam, San Franciso; Donald G. Lombardi, Thousand Oaks, both of CA (US)

(73) Assignee: Drum Workshop, Inc., Oxnard, CA (US)

( * ) Notice: Subject to any disclaimer, the term of this patent is extended or adjusted under 35 U.S.C. 154(b) by 0 days.

(21) Appl. No.: 09/504,422

(22) Filed: Feb. 15, 2000

(51) Int. Cl.[7] .......... G01D 13/08

(52) U.S. Cl. .......... 84/402; 84/403; 84/410; 446/419

(58) Field of Search .......... 84/402, 403, 410; 446/418, 419

(56) References Cited

U.S. PATENT DOCUMENTS

| | | | |
|---|---|---|---|
| 874,526 | 12/1907 | McLaughlin et al. | 446/203 |
| 2,372,780 | 4/1945 | Pitar | 446/251 |
| 3,460,830 | 8/1969 | Barlow et al. | 273/440 |
| 4,179,973 | 12/1979 | White | 84/402 |
| 4,306,485 | 12/1981 | Rudkin | 84/402 |
| 4,658,694 * | 4/1987 | Marks | 84/402 |
| 4,901,617 | 2/1990 | Malone et al. | 84/402 |
| 5,483,859 * | 1/1996 | Singer | 84/402 |
| 5,659,143 | 8/1997 | Isackson | 84/402 |

FOREIGN PATENT DOCUMENTS

3844186 A1 * 7/1990 (DE) .

* cited by examiner

*Primary Examiner*—Shih-Yung Hsieh
(74) *Attorney, Agent, or Firm*—William W. Haefliger

(57) ABSTRACT

A percussion instrument has first and second shells each of which extends away from the other, the shells forming cavities; a closure for one of the shells having a diaphragm portion and closing a portion of the cavity formed by the one shell, the closure spaced from a shell interconnection region; a cavity formed by the other of the shells being open at one end thereof in a direction away from the interconnection region, and loose pellets contained in a portion of the cavity formed by one shell, the pellets freely movable to impact the one shell and diaphragm portion to produce a rattling sound when the instrument is shaken.

9 Claims, 1 Drawing Sheet

RATTLING PERCUSSION INSTRUMENT

BACKGROUND OF THE INVENTION

This invention relates generally to percussion instruments that produce a rattling sound, and more particularly to an improved hand-held percussion instrument that produces that sound when shaken.

There is continual need for percussion instruments that produce different and highly audible sounds. There is also need for such instruments capable of producing sound effects which vary depending upon which portion of the instrument is grasped, and when the instrument is shaken.

SUMMARY OF THE INVENTION

It is a major object of the invention to provide an improved percussion instrument meeting the above needs.

Basically, the improved instrument of the invention comprises:

a) first and second shells each of which extends away from the other, the shells forming cavities, the shells having an interconnection region, b) a closure for one of the shells closing a portion of the cavity formed by said one shell, the closure spaced from said interconnection region, c) a cavity formed by the other of the shells being open at one end thereof in a direction away from the interconnection region, c) and loose pellets contained in the cavity formed by the one shell, the pellets freely movable to impact the one shell and diaphragm portion to produce a rattling sound when the instrument is shaken.

A further object is to provide at least one divider separating the cavities formed by the two shells.

It is another object of the invention to provide such an improved percussion instrument wherein at least one of the shells, and preferably both shells, have conical configuration, and are metallic.

Yet another object is to provide such shells which diverge in opposite directions away from said interconnection region whereby the closure may be located at one extreme end of the instrument on one shell, and wherein the opposite end of the instrument is maintained open, as at the largest end of the other shell, for transmission of rattling sounds, with "megaphone" effect.

An additional object is to provide a method of use of the instrument, which includes e) grasping a selected portion of the instrument, f) shaking the instrument to produce a selected rattling sound, depending on such grasping.

As will be seen, such selected grasping may include covering the open end of the other shell, at times, to produce a "WA-WA" rattling sound.

These and other objects and advantages of the invention, as well as the details of an illustrative embodiment, will be more fully understood from the following specification and drawings, in which:

DRAWING DESCRIPTION

DETAILED DESCRIPTION

Figure 1:
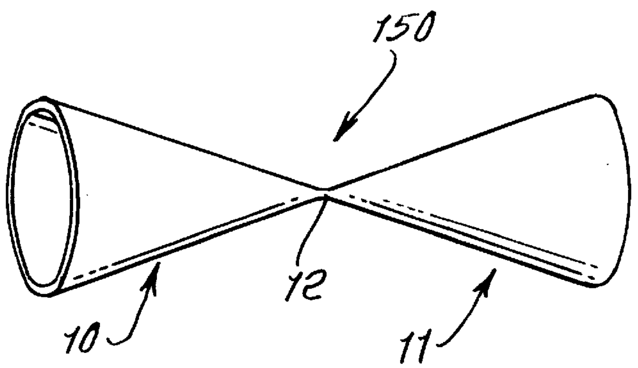
FIG. 1 is a perspective view of a preferred instrument embodying the invention.
Figure 2:
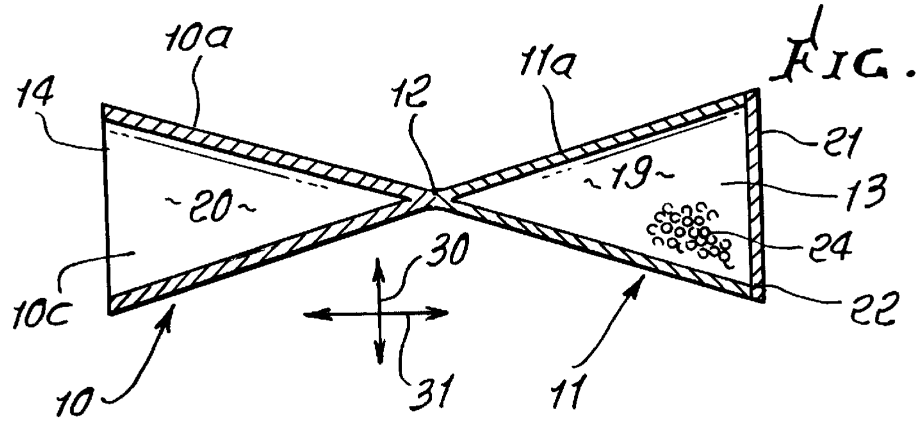
FIG. 2 is an elevation, taken in section through the instrument on an axis through same.
Figure 3:
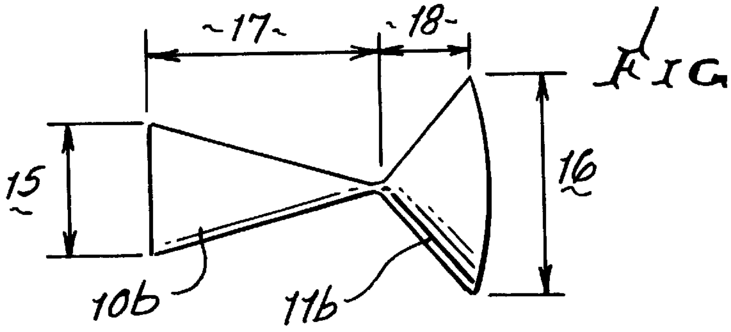
FIG. 3 shows a modification.

As shown in FIGS. 1 and 2, the instrument 50 includes first and second shells each of which diverges away from a narrow interconnection region, said shells forming cavities. The shells are seen at 10 and 11, and the narrow interconnection region at 12. The shells are shown as conical, and as being generally of the same size to diverge endwise oppositely from a mid-region half way between opposite ends of the instrument. Thin metallic shell walls appear at 10*a* and 11*a*, and shell opposite ends at 13 and 14. If desired, one shell may be larger than the other, i.e. the interconnected metallic shells 10*b* and 11*b* may have different large end diameters 15 and 16, and/or may have different lengths 17 and 18, as seen in FIG. 3. A metal diaphragm 21 closes the end of 11*b*, and the large end of 10*b* is open.

As also seen in FIG. 2, the shells form interior cavities 19 and 20, i.e. the shells are hollow, at least in part. Cavity 19 is typically endwise closed, whereas cavity 20 is endwise open. Closing of cavity 19 is preferably by providing a thin closure plate 21 at the shell end 13, the plate peripherally or annularly attached at 22 to the shell, as by welding. Plate 21 is shown as circular in outline. Both shells and the plate are typically metallic.

Loose pellets, as may be metallic, are contained in said portion of the cavity formed by said one shell, the pellets freely movable to impact the one shell and the end plate 21, acting as a diaphragm, to produce a rattling sound when the instrument is shaken. Such pellets are indicated at 24, in cavity 19, and may take the form of gun shot pellets. The pellets do not fill the cavity, so that they may freely move about and impact the interior wall of the shell 10 and the plate or diaphragm 21, when the instrument is shaken. Pellets are also in conical shell 11*b* of FIG. 3.

It will be understood that the open end 10*c* of shell 10 transmits rattling sound, as by megaphone effect. Also, such sound is transmitted from the wall of shell 11 to the interconnection region 12, where the sound is concentrated and then amplified in shell 10. End plate or diaphragm 21 acts to amplify the sound and direct it toward 12 and 10.

In use, the following steps are followed: grasping of a selected portion of the instrument; and shaking the instrument to produce a selected rattling sound. Shaking may be in transverse direction 30, or in length direction 31, or both. Grasping may be at the large end of either shell, or along the shells, or at the intermediate region, whereby, different sound effects are produced. In particular, the open end of shell 10 may be manually covered in part or to, to produce a varied muted or "WA-WA" sound, as selected.

Figure 4:
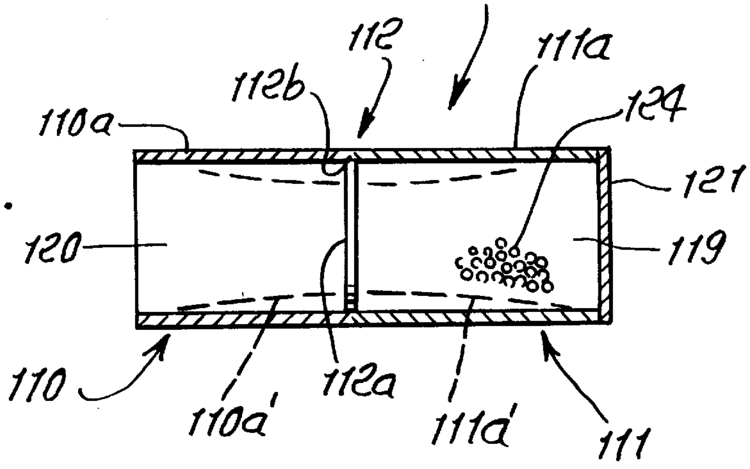
FIG. 4 shows another modification.

In FIG. 4, the two hollow shells appear at 110 and 111. Shell walls are seen at 110*a* and 111*a*. A shell interconnection region is shown at 112; and at least one divider, shown at 112*a*, separates the two cavities 120 and 119 formed by the two shells. The divider may take the form of a thin metallic diaphragm peripherally joined at 112*b* to the shell region 112. If one or both of the shell walls is somewhat conical, as indicated by broken lines 110*a*' and 111*a*', the divider 112*a* has reduced diameters.

Cavity 119 is shown as closed, as by metallic closure plate or diaphragm 121; whereas cavity 120 is endwise open. Loose pellets 124, as may be metallic are contained in cavity 119, to be freely movable upon shaking of the instrument 150, whereby the pellets strike the inner wall of shell 111, and the diaphragms 121 and 112*a*, to produce a rattling sound. Open end 110*c* of shell 110 transmits the rattling sound which is enhanced due to use of two diaphragms 121 and 112*a*.

What is claimed is:

1. The method of playing a percussion instrument that comprises:

a) first and second shells each of which extends away from the other, said shells forming cavities, said shells having an interconnection region, b) a closure for one of the shells closing a portion of the cavity formed by said one shell, said closure spaced from said interconnection region, and having a diaphragm portion, c) a cavity formed by the other of the shells being open at one end thereof in a direction away from said interconnection region, d) and loose pellets contained in said portion of the cavity formed by said one shell, the pellets freely movable to impact the one shell and diaphragm portion to produce a rattling sound when the instrument is shaken, said method including e) selectively grasping the instrument, f) shaking the instrument to cause the pellets to impact the one shell and said diaphragm portion to produce a selected rattling sound projected from said open end of said other shell, g) and including covering said end of the other shell at times during said shaking.

2. The method of claim 1 including providing at least one of said shells to have generally conical configuration, and said one shell is metallic.

3. The method of claim 1 including providing at least one divider separating the cavities formed by the two shells.

4. The method of claim 1 including providing said shells to diverge in opposite directions away from said interconnection region.

5. The method of claim 1 wherein said closure is provided in the form of a thin plate located proximate the end of said one shell furthest from the interconnection region.

6. The method of claim 5 wherein said thin plate is provided to be metallic and peripherally connected to said one shell at an end thereof.

7. The method of claim 1 wherein said shells are provided to have substantially the same size.

8. The method of claim 1 wherein said shells are provided to be conical and to have different sizes.

9. The method of claim 1 wherein said covering is manually effected.

* * * * *